US009603021B2

(12) United States Patent
Scahill et al.

(10) Patent No.: US 9,603,021 B2
(45) Date of Patent: Mar. 21, 2017

(54) ROGUE ACCESS POINT DETECTION

(71) Applicant: BRITISH TELECOMMUNICATIONS public limited company, London (GB)

(72) Inventors: Francis James Scahill, London (GB); Richard Joseph Evenden, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 14/361,959

(22) PCT Filed: Nov. 30, 2012

(86) PCT No.: PCT/GB2012/000879
§ 371 (c)(1),
(2) Date: May 30, 2014

(87) PCT Pub. No.: WO2013/079905
PCT Pub. Date: Jun. 6, 2013

(65) Prior Publication Data
US 2014/0325615 A1 Oct. 30, 2014

(30) Foreign Application Priority Data
Nov. 30, 2011 (EP) .................................. 11250916

(51) Int. Cl.
*H04W 12/08* (2009.01)
*H04L 29/06* (2006.01)
*H04W 12/12* (2009.01)

(52) U.S. Cl.
CPC ............. *H04W 12/08* (2013.01); *H04L 63/08* (2013.01); *H04L 63/0876* (2013.01);
(Continued)

(58) Field of Classification Search
CPC . H04L 63/14; H04L 63/1408; H04L 63/1416; H04L 63/1425; H04L 63/1433
See application file for complete search history.

(56) References Cited

U.S. PATENT DOCUMENTS 7,346,338 B1 * 3/2008 Calhoun ............. H04L 63/1408
455/410
8,069,483 B1 * 11/2011 Matlock ................ H04W 12/12
713/154
(Continued)

FOREIGN PATENT DOCUMENTS

WO    WO 2011087285 A2 *  7/2011   ....... H04L 29/12028

OTHER PUBLICATIONS

Lee, Translation of WO 2011087285. Published Jul. 2011. Accessed from WIPO on Sep. 30, 2015.*
(Continued)

*Primary Examiner* — Jung Kim
*Assistant Examiner* — Ngoc D Nguyen
(74) *Attorney, Agent, or Firm* — Nixon & Vanderhye P.C.

(57) ABSTRACT

A public wireless access point network includes authorized access points sharing the same SSID and connected to a network core which implements centralized authentication so that wireless client devices can roam between authorized access points. Each authorized access point is adapted to detect the presence of unauthorized rogue access points posing as authorized access points. The authorized access points inspect data packets received from wireless client devices which have roamed into range and from the addressing information in the MAC layer and IP layer can determine whether the wireless device has previously connected to a rogue access point. If such a determination is made, the user of the device is alerted that their confidential information may have been compromised.

19 Claims, 6 Drawing Sheets

(52) U.S. Cl.
CPC ...... *H04L 63/1408* (2013.01); *H04L 63/1416* (2013.01); *H04L 63/1425* (2013.01); *H04L 63/1433* (2013.01); *H04W 12/12* (2013.01)

(56) References Cited

U.S. PATENT DOCUMENTS

| | | | |
|---|---|---|---|
| 2004/0049699 A1* | 3/2004 | Griffith | H04L 63/1408 726/23 |
| 2005/0060576 A1 | 3/2005 | Kime et al. | |
| 2006/0200862 A1* | 9/2006 | Olson | H04L 63/1433 726/23 |
| 2007/0025334 A1 | 2/2007 | Meyer | |
| 2008/0141369 A1 | 6/2008 | Butti et al. | |
| 2010/0214956 A1* | 8/2010 | Law | H04L 12/14 370/255 |

OTHER PUBLICATIONS

International Search Report dated Aug. 18, 2014 issued in corresponding GB Application No. PCT/GB2012/000879 (3 pages).

International Preliminary Report on Patentability mailed Sep. 9, 2014, issued in corresponding GB Application No. PCT/GB2012/000879 (6 pages).

Written Opinion of the International Searching Authority mailed Sep. 9, 2014, issued in corresponding GB Application No. PCT/GB2012/000879 (5 pages).

* cited by examiner

ROGUE ACCESS POINT DETECTION

This application is the U.S. national phase of International Application No. PCT/GB2012/000879, filed 30 Nov. 2012, which designated the U.S. and claims priority to EP Application No. 11250916.1, filed 30 Nov. 2011, the entire contents of each of which are hereby incorporated by reference.

INTRODUCTION

Background and Summary

The present invention relates to computer networks and in particular to a method and apparatus for determining rogue entities on a wireless network infrastructure.

IEEE 802.11 is a set of standards for implementing wireless local area network (WLAN) communication between devices using an over the air protocol. In order to distinguish such WLANs, the 802.11 standard specifies that a wireless access point generating a WLAN is a Basic Service Set (BSS) and it must be named using a Service Set Identifier (SSID).

Due to the range limitations of WiFi transmission, the 802.11 standards also allow for multiple wireless access points to be configured to present the same SSID and thereby provide access to the same network. To enable this additional functionality, the 802.11 standards specify an "extended service set" (ESS) which allows for a set of one or more interconnected BSSs and integrated local area networks that appear as a single BSS to the logical link control layer at any station associated with one of those BSSs. An extended service set is specified using an extended Service Set Identification (ESSID). This may be desirable in situations such as in a building which is larger than the range of a single wireless access point.

In recent years public Wi-Fi, or "hotspot" networks have been implemented to provide connectivity over a much wider area following the Universal Access Methodology (UAM) of a single network accessible from many locations using the same credentials. An example of a country wide scheme is "BT Openzone" created and managed by British Telecommunications Plc™. In public area networks, a set of wireless access points, known as "hotspots" are configured to provide WLANs having the same ESSID (such as BT Openzone) and users can connect to them in order to gain access to external networks such as the Internet. Unlike typical "private" WLANs; the wireless access points in a hotspot network do not implement authentication security measures such as WEP and WPA but are "open". This means that, any wireless client device wishing to join with the public network via a hotspot does not need to know a predetermined key or passphrase.

While any device can join a hotspot in a public Wi-Fi network, the devices do not gain access to external networks such as the internet until they have passed security checks implemented by an Authentication, Authorisation & Accounting (AAA) server located within the core of the public access network. Such security checks ensure that the user of the connecting device has paid or is otherwise authorised to use the public Wi-Fi network.

To implement this, the hotspots are configured to redirected users to a login page hosted by a proxy gateway in the core of the public Wi-Fi network. The user can then enter credentials which are forwarded to an AAA server for authentication. If the authentication is successful, then the user can access the Internet.

One problem with the initial open nature of public access Wi-Fi networks is that malicious entities can set up their own access points and configure them to have the same ESSID as a genuine hotspot. A user of the public Wi-Fi network could connect to this rogue hotspot and in this way the rogue hotspot could intercept all of the user's data packets and obtain confidential information. If the rogue access point is further configured to redirect the client device to a spoofed login page, then the user's login information to the real public Wi-Fi network could also be obtained.

Standards such as 802.1x have been proposed to provide 2-way authentication such that the client device can be sure it is in communication with a genuine hotspot but this is not yet widely implemented because it relies on a supplicant being installed in advance on the client device.

It is known for wireless access points to periodically turn off their WLAN and enter a listening mode in order to determine if there are any other access points (including rogue or private LANs access points) in the surrounding area. However the disadvantage of such active scanning is that there is a loss of service when the access point functionality is turned off. Furthermore, the range of the scan is limited to the propagation range of the wireless signal that can be received. It is therefore desirable to have a more transparent method of detecting rogue access points and alerting users when such devices are detected.

The present invention sets out to address the above problems.

STATEMENTS OF INVENTION

In one aspect, the present invention provides a method of rogue access point detection as set out in claim 1.

In another aspect, the present invention provides an access point in a wireless access network according to claim 4.

In a further aspect, the present invention provides an access network according to claim 7.

BRIEF DESCRIPTION OF THE DRAWINGS

List of Figures

Embodiments of the present invention will now be described with the aid of the accompanying drawings in which.

DETAILED DESCRIPTION OF PRESENT EXAMPLE EMBODIMENTS

1$^{st}$ Embodiment

Figure 1:
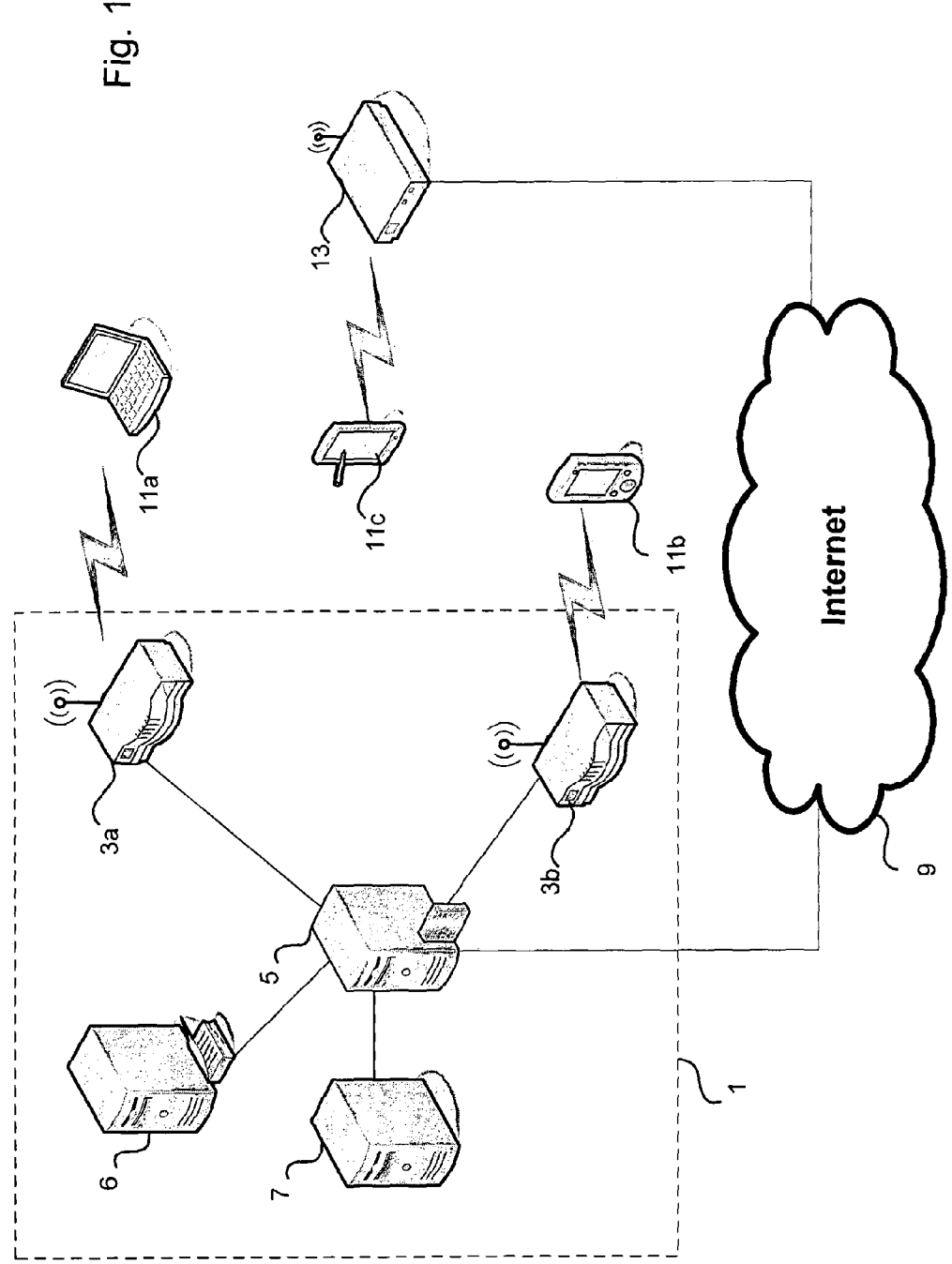
FIG. 1 shows an example public Wi-Fi network in accordance with a first embodiment of the present invention.

FIG. 1 shows part of a BT Openzone public Wi-Fi network 1 in accordance with a first embodiment. As shown in FIG. 1, the BT Openzone network 1 has two public Wi-Fi access points 3 (hereinafter referred to as genuine hotspots 3), a Public Access Control (PAC) gateway 5, a Dynamic Host Configuration Protocol (DHCP) server 6 and a Remote Authentication Dial In User Service (RADIUS) server 7. FIG. 1 also shows two wireless client devices 11 such as a laptop computer and a PDA which require access to the Internet 9. The BT Openzone network 1 actually consists of a premium Openzone network of hotspots located in retail and public places, and also includes a public network formed of customer home wireless access points known as FON. This embodiment relates to the BT Openzone network of premium hotspots and therefore the genuine hotspots are premium BT hotspots.

Each genuine hotspot 3 generates a WLAN carrying the "BT Openzone" ESSID and while the genuine hotspots 3 are located at a different geographical location but they are close enough to have overlapping ranges.

The genuine hotspots 3 are typically located in public places such as shops, telephone boxes or railway stations. Each genuine hotspot 3 is a wireless router device capable of operating under the IEEE 802.11n, 802.11g & 802.11b standards within the BT Openzone hotspot network 1) and configured so that it provides a bridge between external networks as well as components in the network 1 and wireless client devices 11. In this embodiment, the connection to other components in the network BT Openzone public network 1 is via a wired connection such as Gigabit Ethernet or a Digital Subscriber Line (DSL).

The BT Openzone public Wi-Fi network 1 also includes a Public Access Control (PAC) Gateway 5. This component is responsible for providing access and control services within the BT Openzone network 1 such as IP address allocation. It also manages the web page redirection functionality to direct client devices to the BT Openzone login web page so that users can log into the BT Openzone network 1 in order to access external networks such as the Internet 9.

In order to validate the user credentials and establish payment for the services, the PAC gateway 5 sends the user's log in information to the RADIUS server 7 and if the credentials are correct, then the PAC gateway will allow the wireless client device to access the external networks.

Due to this centralised authentication process, wireless client devices 5 can therefore connect to any genuine hotspot 3 forming part of the BT Openzone public Wi-Fi network 1 and gain access to the same services using a single set of credentials.

Conventional Configuration

The conventional process for a wireless client device 11 (in this example the laptop 11a) joining the BT Openzone network 1 will now be described. When the user of the laptop 11a enables the Wi-Fi connection the laptop 11a will perform a scan for surrounding hotspots. Assuming the BT Openzone SSID is already stored in a profile, the laptop 11a will see both genuine hotspots 3a and 3b. In order to choose which hotspot 3 to connect to, the laptop 11a simply chooses the hotspot providing the strongest wireless signal strength. In this example, the connection to genuine hotspot 3a is better so the laptop 11a chooses that hotspot for authentication and association. As mentioned above, in BT Openzone there is no encryption via WEP or WPA in the data link layer and so the laptop 11a merely needs to send its own MAC address to the hotspot 3a and the hotspot 3a replies with a success response. The next stage is association so that the security and bit rate options between the laptop 11a and the hotspot 3a are established. In particular, the laptop 11a learns the MAC address of the hotspot 3a and the hotspot 3a maps an association identifier logical port to the laptop 11a. The next stage involves the laptop issuing a DHCP request to the hotspot's DHCP Server 6 located within the network core. From the DHCP request the laptop will be supplied with: an IP address, a subnet mask, a gateway IP address (5) and a DNS IP address.

Once this is complete the laptop 11a issues an Address Resolution Protocol (ARP) request in order to obtain the layer 2 MAC address for the PAC gateway IP address. The ARP response contains the MAC address of the PAC gateway 5 for the hotspot. The laptop then updates its routing table so that packets are forwarded to the hotspot 3a via the PAC gateway 5.

At this stage the laptop 11a is associated with the hotspot 3a and has presence on the BT Openzone network. However, the laptop 11a cannot yet access the Internet 9 because of the second stage of authentication. When the user of the laptop 11a requests a webpage using their browser software, the hotspot 3a forwards the request to the PAC gateway 5 which redirects the client to a BT Openzone login page instead of the requested page so that the user can authenticate with login credentials such as username and password. To prevent unauthorised access, this login page is secured using an encrypted Secure Sockets Layer (SSL) session between the laptop's 11a browser session and the PAC Gateway. The entered credentials are forwarded to the RADIUS server 7 and if they are correct and the user has sufficient credit, then the PAC gateway 5 allows access to the Internet. It also causes the browser to open a new window with a link to give the user the option to disconnect from the BT Openzone network 1 to avoid excessive costs.

Since the laptop 11a is a mobile device, it is configured to periodically poll the surrounding area and make a note of the surrounding SSIDs and the relative signal strengths. In this way, if the user of the laptop 11a moves location, then the wireless device can associate with a different hotspot providing stronger signal strength.

For example, if the laptop 11a has physically moved to be closer to hotspot 3b and therefore sees stronger signal strength to hotspot 3b compared with the signal strength of hotspot 3a, the data link layer will disassociate with hotspot 3a and authenticate and associate with hotspot 3b. However, the higher network layers will not realise that they are, communicating with a different physical device because the (layer 3) IF stack of the client device has not been informed. The laptop 11a already has an IP address and the default gateway information (including the gateway MAC address) is the same so therefore the laptop 11a will continue to send data packets to a valid IP address.

Upon receiving these data packets, the new hotspot 3b recognises the gateway MAC address as being its own and therefore delivers the packets as normal.

Rogue Access Points

A known problem with public Wi-Fi networks is the presence of rogue access points, i.e. wireless access points which are not part of the public Wi-Fi network but pretend to be in order to steal user information.

FIG. 1 also shows a further access point 13 which is not a genuine BT Openzone hotspot 3 but has been configured by a malicious entity to masquerade as one. To achieve this it also has an ESSID of "BT Openzone" and therefore any wireless client device 11 such as a pda 11c which determines a greater signal strength from the rogue wireless access point 13 than other genuine hotspots 3 could connect to the rogue wireless access point 13 believing it is part of the BT Openzone network. This rogue wireless access point 13 may even present a fake version of the login page in order to steal the user's login credentials.

The rogue wireless access point 13 is also connected to the Internet and therefore once the client device 11*c* has authenticated and associated with the rogue wireless access point 13, the rogue wireless access point 13 provides access to the Internet. Since the rogue wireless access point 13 can sniff data packets travelling between the wireless client device 11*c* and a correspondent node located on the internet the rogue wireless access point 13 would be able to capture any unencrypted data.

This problem is particularly relevant to smartphone devices which are set up to automatically connect to the BT Openzone hotspot network 1 in an unattended manner by way of an app, or via commercial agreements between the cellular network operator and BT Openzone.

Genuine Hotspot

Figure 2:
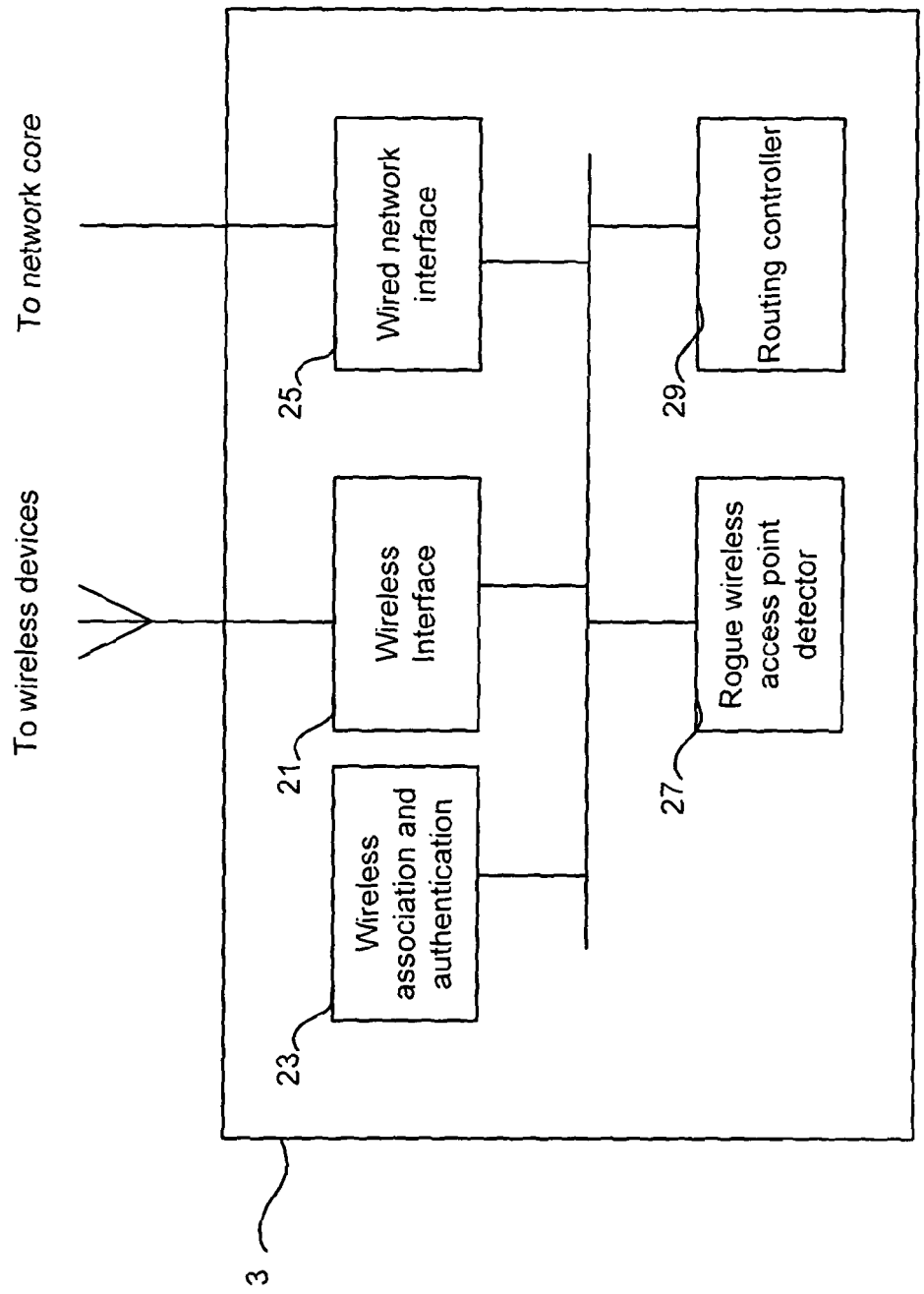
FIG. 2 shows the functional components of a genuine hotspot forming a part of the public Wi-Fi network illustrated in FIG. 1.

FIG. 2 shows the functional components of a genuine hotspot 3 according to the present embodiment. The genuine hotspot 3 contains wireless network interface 21, wireless association and authentication 23, a wired network interface 25, a rogue access point detector 27 and a routing controller 29. The wireless association and authentication unit 23, rogue access point detector 27 and routing controller 29 are software functions running on a processor (not shown) executing appropriate program instructions.

The wireless network interface 21 is a standard component capable of operating under the IEEE 802.11n, 801.11b & 802.11g standards and it broadcasts its SSID of BT Openzone to the surrounding area and when a client device 11 wishes to connect to the genuine hotspot 3, the wireless association and authentication unit 23 deals with the usual association and authentication issues so as to enable communication with the wireless client device 11 and the network core via the wired network interface 25. The routing controller 29 updates its internal routing tables (not shown) to record the wireless device's network addresses and to ensure that the packets to and from that device are correctly routed. The wired network interface 25 is a very-high-bit-rate Digital Subscriber Line (VDSL) interface to the PAC gateway 5.

The rogue access point detector 27 is a new component that is responsible for determining whether a wireless client 11 has roamed from an authentic hotspot or more importantly whether that wireless client 11 had been connected to a rogue wireless access point.

Instead of simply ignoring any packets which aren't directed to the genuine hotspot's 3 MAC address, the rogue access point detector 27 examines these packets to infer information about the previously connected hotspot. If it determines that the previous hotspot was a rogue wireless access point 13, then it can inform the user of the client device 11 that their information may have been compromised so that they can take appropriate action.

Initial Configuration

Before the specific processing of the rogue access point detector is described, the initial state of the network shown in FIG. 1 will be explained.

The two genuine hotspots 3 have the following configuration:

| Hotspot ID | Gateway MAC Address | Gateway External IP Address | SSID |
|---|---|---|---|
| 3a | 00:00:DB:00:25:41 | 10.10.1.254 | BT Openzone |
| 3b | 00:00:DB:00:25:41 | 10.10.1.254 | BT Openzone |

The rogue access point 13 has the following configuration:

| Server ID | MAC Address | External IP address | SSID |
|---|---|---|---|
| 13 | 00:15:9F:72:01:AE | 10.10.1.254 | BT Openzone |

The wireless client devices 11 have the following configuration:

| Device | MAC Address | IP address | Default gateway |
|---|---|---|---|
| 11a | 00:03:7F:02:46:F3 | 10.10.1.75 | 10.10.1.254 |
| 11b | 00:48:54:03:CB:21 | 10.10.1.200 | 10.10.1.254 |
| 11c | 00:26:37:AF:01:1D | 10.10.1.13 | 10.10.1.254 |

Client devices 11*a* and 11*b* are connected to the genuine hotspots 3*a* and 3*b* respectively. Client device 11*c* is connected to rogue access point 13 but the user of this device has moved location and is about to connect to genuine hotspot 3*a*.

Rogue Detection Operation

Figure 3:
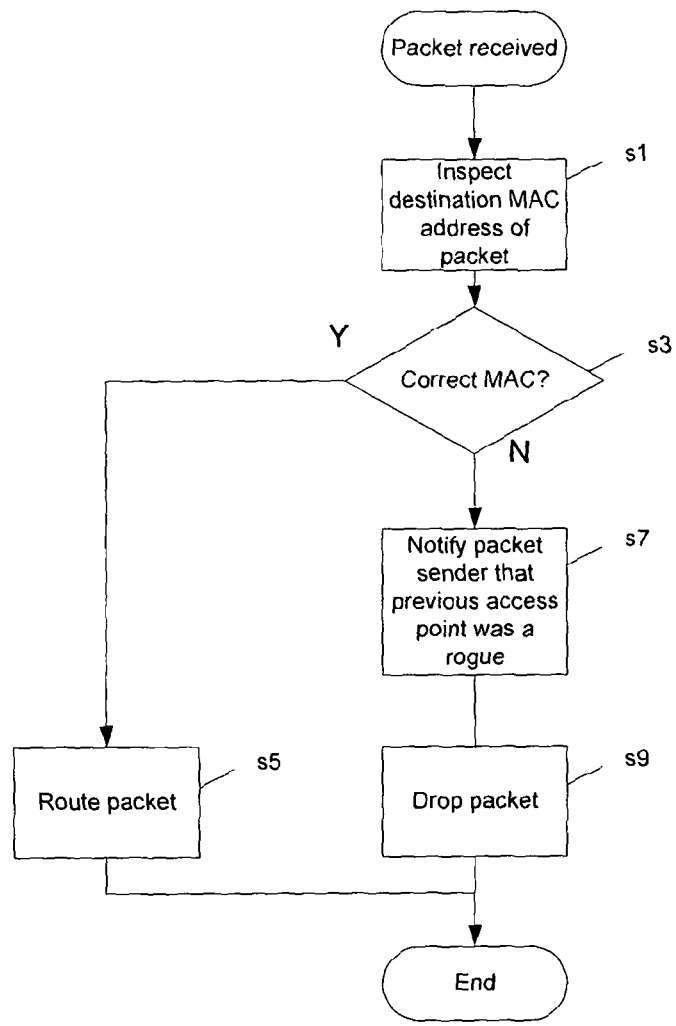
FIG. 3 is a flow chart showing the operational steps performed by a genuine hotspot to detect rogue access points in the first embodiment.

The operation of the genuine hotspots 3*a* to detect rogue access points 13 by the association behaviour of client device 11*c* will now be described with reference to the flowchart shown in FIG. 3.

When a data packet is received on the wireless network interface 21, in step s1 the rogue access point detector 27 examines the packet and in particular the information in the destination MAC address field. In step s3 the rogue access point detector 27 checks if the destination MAC address in the packet matches that of the genuine hotspot gateway 3. If the MAC address in the packet matches, i.e. is 00:00:DB:00:25:41, then the packet is assumed to have come from an existing authenticated device 11 such as laptop 11*a* or an authorised client device that has roamed to the current genuine hotspot from another genuine hotspot. Processing moves to step s5 in which the packet is routed to the next destination and then processing by the rogue access point detector 27 for the packet ends.

If the MAC address does not match, the genuine hotspot 3 determines that the previous access point was a rogue access point 13. In step s7, the rogue access point detector 27 is arranged to notify the user of the wireless client device 11 that their personal information may have been compromised.

This may be achieved in a number of ways, for example by sending the client to a pre-prepared message stored in the genuine hotspot 3, or a page redirection to a warning page. Furthermore, since the BT Openzone network 1 contains profile information for each user. The profile can be examined for alternative contact information such as a telephone number or email so that the user can be alerted.

Once the warning has been sent, then in step s9 the received packet is dropped by the genuine hotspot and processing ends.

In the first embodiment, the genuine hotspots 3 are able to determine the presence of a rogue access point based on the received packets from client devices. This has a number of advantages over conventional methods of rogue access point detection. The genuine hotspots do not need to actively monitor for rogue access points. This improves the throughput of the hotspots because there is no need to switch from transmission to a listen only mode so as to pick up possible rogues.

Another advantage is that the hotspots can deduce that a rogue access point may be nearby even if it is outside of the hotspot's wireless range since the client device has recently roamed to the current hotspot.

The first embodiment therefore provides an effective way to detect rogue access points in a passive manner based on the information contained within received data packets.

2$^{nd}$ Embodiment

In the first embodiment, the rogue access points are detected by a genuine hotspot having a rogue access point detector which checks whether the MAC address matches the default gateway MAC address. Such processing is particularly relevant for BT Openzone's premium hotspot devices. As mentioned earlier, the BT Openzone public Wi-Fi network also includes a home user network known as FON.

Figure 4:
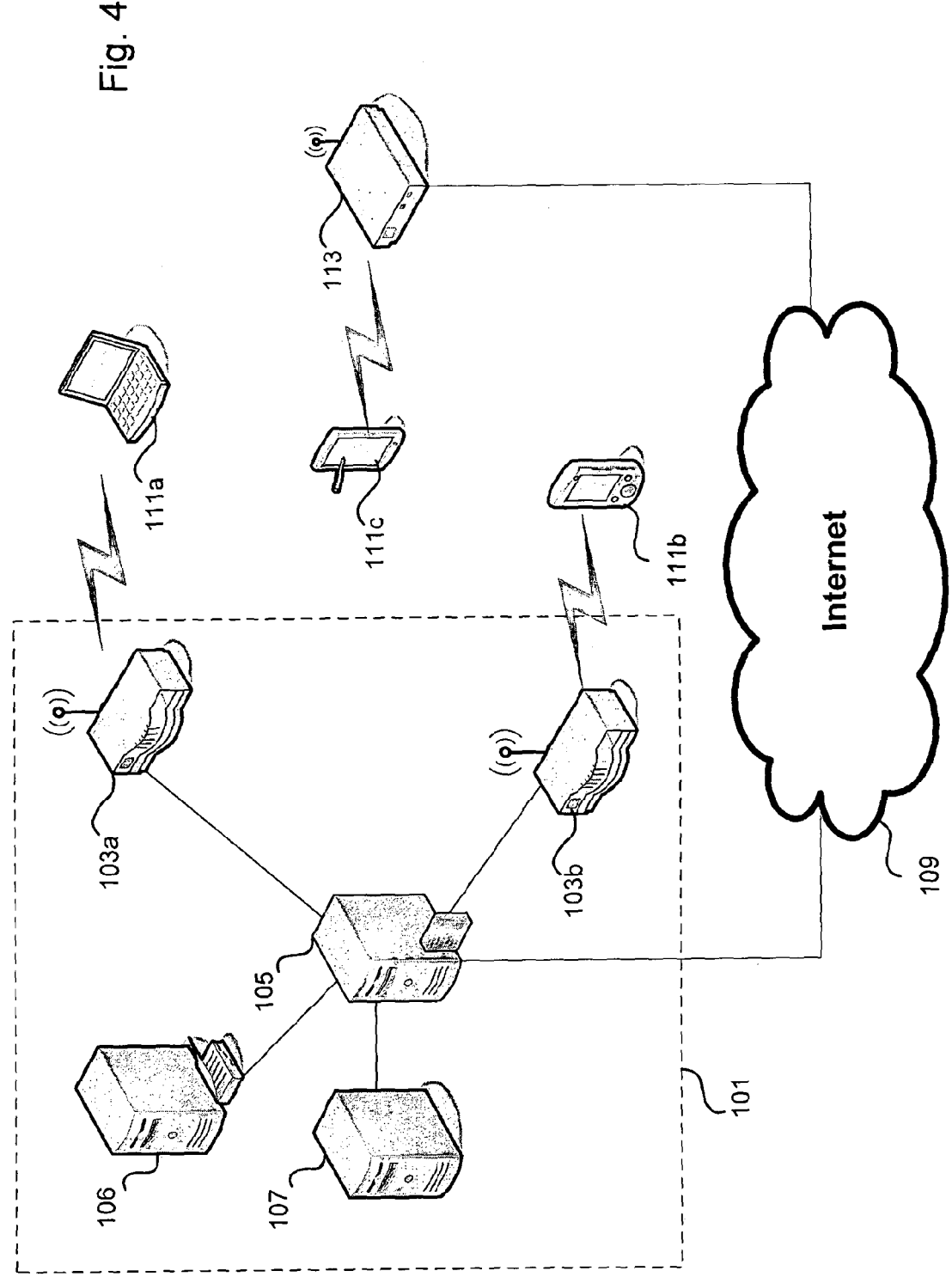
FIG. 4 shows an example public Wi-Fi network in accordance with a second embodiment of the present invention.

FIG. 4 shows an example network 101 having public Wi-Fi wireless access points 103, a PAC gateway 105, a DHCP server 106 and a RADIUS server 107 for allowing client devices 111 to connect to the Internet 109. The operation of the core network components PAC gateway 105, DHCP server 106 and RADIUS server. 107 are the same as their corresponding components in the first embodiment and so their functionality will not be described again.

The genuine hotspots 103 are FON hotspots instead of premium Openzone hotspots, and due to configuration differences, their processing is slightly different from the premium genuine hotspots in the first embodiment. The general functional components of these genuine hotspots 105 are the same as the genuine hotspots 3 in the first embodiment.

For example, in the conventional case, if the laptop 111*a* has physically moved to be closer to hotspot 103*b* and therefore sees stronger signal strength to hotspot 103*b* compared with the signal strength of hotspot 103*a*, the data link layer will disassociate with hotspot 103*a* and authenticate and associate with hotspot 103*b*. However, the higher network layers will not realise that they are communicating with a different physical device because the (layer 3) IP stack of the client device has not been informed. The laptop 111*a* already has an IP address and the default gateway information (including the gateway MAC address) is the same so therefore the laptop 111*a* will continue to send data packets to a valid IP address.

Upon receiving these data packets, the new hotspot 103*b* does not recognise the gateway MAC address as being its own and therefore simply ignores the packets without returning any messages or delivery reports to the laptop 111*a*. After a predetermined period of inactivity, the packets time out and so the laptop 111*a* reissues a request for address resolution in order to obtain the correct MAC address for the new hotspot 103*b*. Once this new association has been established, the hotspot will again forward data requests to the PAC gateway 105 which redirect the user to the log in page. Once the user has again logged in and their credentials have been verified, then the browsing session can continue.

Figure 5:
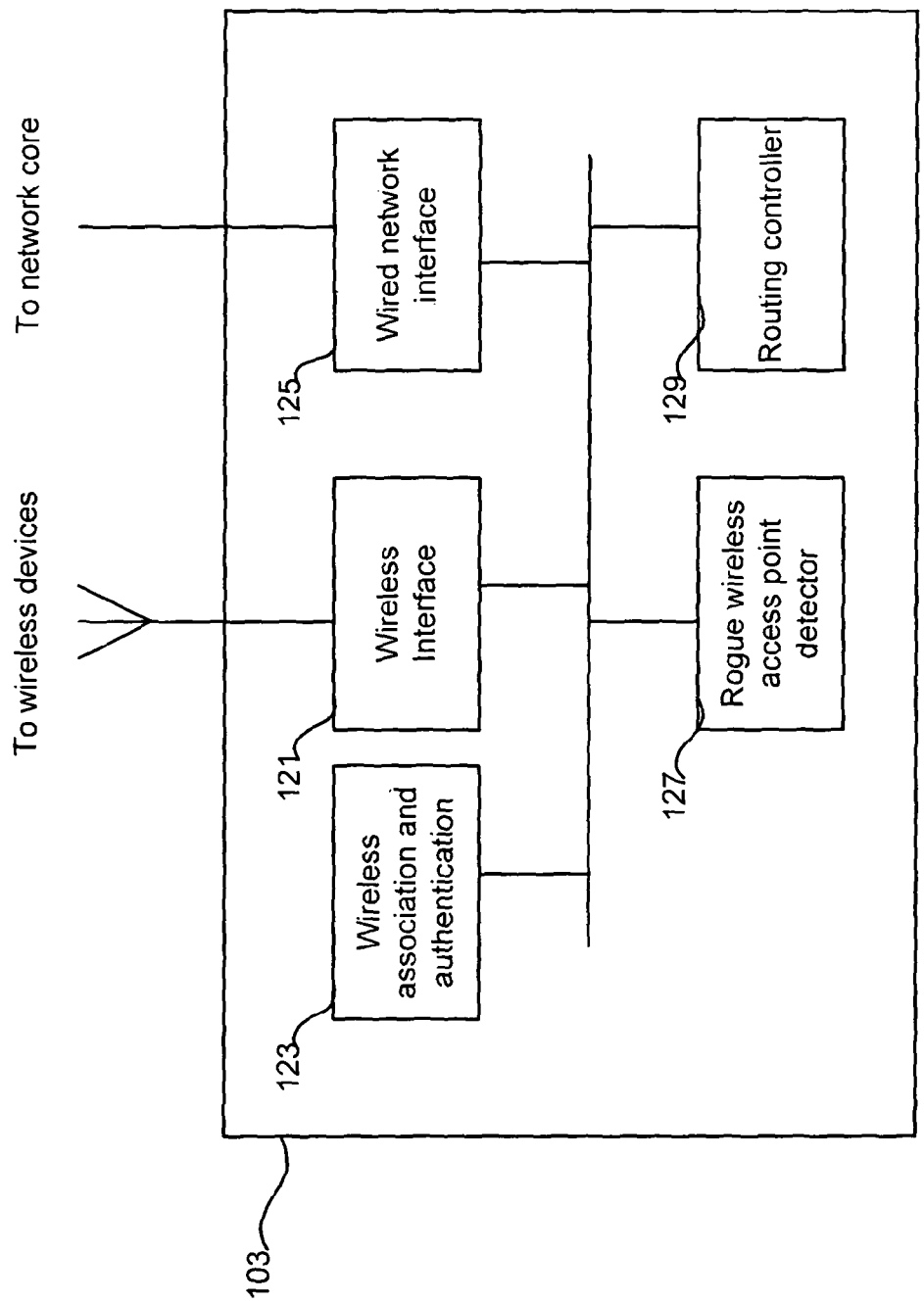
FIG. 5 shows the functional components of a genuine hotspot forming a part of the public Wi-Fi network illustrated in FIG. 4.

FIG. 5 shows the functional components of the genuine hotspots 103. The genuine hotspot 103 contains a wireless interface 121, a wireless association and authentication module, a wired network interface, a rogue access point detector 127 and a routing controller 129. The functional components are similar to their counterpart modules in the first embodiment namely wireless interface 21, wireless association and authentication 23, wired network interface 25 and routing controller 29.

Figure 6:
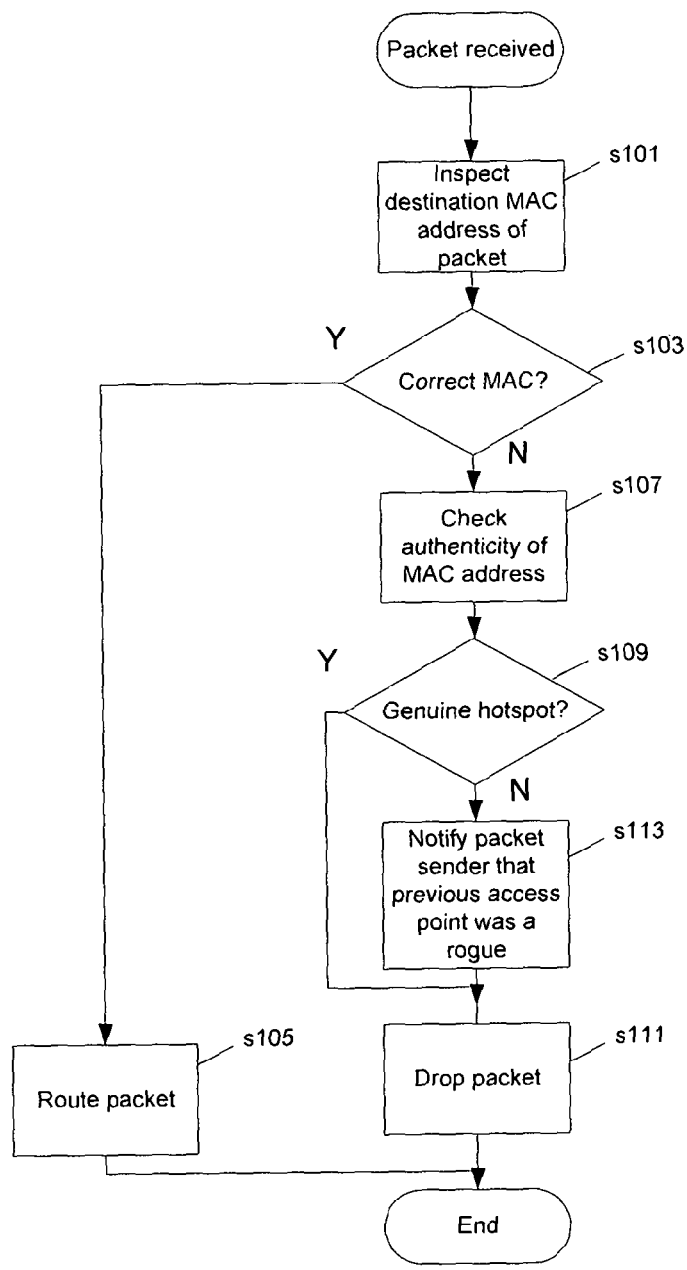
FIG. 6 is a flow chart showing the operational steps performed by a genuine hotspot to detect rogue access points in the second embodiment.

In order to detect rogue access points in the BT FON system, the genuine hotspots functionality of the rogue access point detector 127 is slightly different to that of the rogue access point detector 27 in first embodiment and will be described with reference to FIG. 6. The initial configuration of the rogue access point 113 and the client devices 111 is the same as the rogue access point 13 and the client devices 11 respectively in the first embodiment.

The configuration of the FON genuine access points 103 is set out below:

| Hotspot ID | Gateway MAC Address | Gateway External IP Address | SSID |
|---|---|---|---|
| 103a | 00:00:DB:00:25:41 | 10.10.1.254 | BT Openzone |
| 103b | 00:00:DB:00:59:A3 | 10.10.1.254 | BT Openzone |

Operation

When a data packet is received on the wireless network interface 121, in step s101 the rogue access point detector 127 examines the packet and in particular the information in the destination MAC address field. In step s103 the rogue access point detector 127 checks if the destination MAC address in the packet matches that of the genuine hotspot gateway 103. If the MAC address in the packet matches, i.e. is 00:00:DB:00:25:41, then the packet is assumed to have come from an existing authenticated device 111 such as laptop 111*a*. Processing moves to step s105 in which the packet is routed to the next destination and then processing by the rogue access point detector 127 for the packet ends.

If the MAC address does not match, then the packet is assumed to be from a new client device 111 that has roamed into the range of the genuine hotspot 103.

In step s107 the rogue access point detect& 127 checks the authenticity of the MAC address, i.e. whether the MAC address is that of a genuine hotspot 103 within the FON network 101.

To carry out this test, it is not necessary for the rogue access point detector 127 to have knowledge of every genuine hotspot 103 in the entire public Wi-Fi network 101. Looking at the configuration data, it can be seen that BT Openzone genuine hotspots 103 all have a unique MAC address prefix of 00:00:DB which is unique to BT routers in the MAC addressing scheme. Therefore the rogue access point detector 127 does not need to do extensive processing to determine whether the access point is authentic and allowed on the network. It only needs to match the first 3 octets in the MAC address with the authorised octets of 00:00:08.

In step s109, a test is performed to check whether the analysed packet relates to an authentic hotspot 103. If the test is passed and the first 3 octets match, then the rogue access point detector 127 concludes that the packet was received from a client device 111*b* which was previously attached to a genuine hotspot 3 such as PDA-444-hotspot 103*b*. In this case processing proceeds to step s111 where the genuine hotspot 103*a* drops the data packet so that the client device will eventually request a new association with the new genuine hotspot 103a and the routing controller 129 can update its routing information.

If the test fails at step s29, then the rogue access point detector 127 infers that the previous access point was a rogue access point 13. In step s33, the rogue access point detector 27 is arranged to notify the user of the wireless client device 111c that their personal information may have been compromised.

This may be achieved in a number of ways, for example by sending the client to a pre-prepared message stored in the genuine hotspot 103, or a page redirection to a warning page. Furthermore, since the BT Openzone network 101 contains profile information for each user. The profile can be examined for alternative contact information such as a telephone number or email so that the user can be alerted.

Once the warning has been sent, then in step s111 the received packet is dropped by the genuine hotspot and processing ends.

In the second embodiment the genuine hotspots 103 contain rogue access point detectors 127 in order to detect rogue access points 113 within a public Wi-Fi network such as the BT FON network 101.

As with the first embodiment the genuine hotspots are able to detect the rogue access points and to alert the users of client devices which have roamed over from a rogue access point located in the Vicinity of the genuine hotspot. The genuine hotspot is able to carry out this detection without having to actively scan for rogue access points. The passive detection prevents loss of service in the genuine hotspot and also allows for the detection of rogue access points which are beyond its scanning range.

3$^{rd}$ Embodiment

In the first embodiment and second embodiment, the rogue access point 13, 113 is configured to have the same ESSID as the genuine hotspots 3, 103. By examining the MAC address of incoming data packets, the genuine hotspots 3, 103 are able to detect rogue access points 13, 113 and alert any client which roamed over from the rogue access point 13, 113.

However, the owner of the rogue access point 13, 113 may also change the MAC address of the rogue access point gateway to appear as if it is a genuine hotspot in order to further hide the rogue access point 13, 113 from detection. This is because it is fairly easy to change the reported MAC address using a technique known as MAC address spoofing. For example, in the example described in the first embodiment, the rogue hotspot could spoof its address to have the MAC prefix 00:00:DB associated with BT Openzone routers and thereby pass the address checking test carried out by the next authentic hotspot that the client device connects to.

In order to detect rogue hotspots implementing MAC address spoofing, in the third embodiment, the processing of the rogue access point detector includes a further step between steps s1 and s3 of the first embodiment and steps s101 and s103 of the second embodiment. In this processing step, the rogue access point detector checks for a spoofed MAC address by consulting the DHCP server 6, 106 in the core of the network 1, 101. The DHCP server 6, 106 contains a list of the IP addresses and MAC address pairings which have been allocated within the network 1,101.

If the MAC and IP address pairing in the data packet is present in the DHCP server list, the processing of the first and second embodiment proceeds to step s3 or s103 respectively.

However, if the MAC/IP pair is not present then processing proceeds to step s7 and s113 respectively of the first and second embodiment in order to alert the user that they have been using a rogue access point.

In this embodiment, rogue access points are detected even when the rogue access point uses MAC address spoofing.

4$^{th}$ Embodiment

In the third embodiment, genuine hotspots can detect the presence of rogue hotspots using MAC address spoofing in a case where the rogue hotspot spoofed the genuine hotspot's MAC address. This was possible because the genuine hotspots are configured to remember which MAC and IP address pairs they had issued.

Furthermore, where the MAC addressed had been spoofed to make the rogue access point appear to be a different genuine hotspot, the function of the DHCP server in remembering all the allocated IP and MAC address pairs allowed the genuine hotspots to determine externally allocated addresses. In this embodiment, to further improve the ability to detect rogue access points using MAC address spoofing, a second test for MAC address spoofing is described. This test relies on a location table in the network core which maintains a record of the position of genuine hotspots.

When the rogue access point detector checks for a spoof MAC address, it sends its own MAC address and the MAC address in the packet to the location server. The location server determines their relative locations and if the distance between them is above a threshold, then the location returns an alert. In response to this alert, the rogue access point detector alerts the user of the client device.

Modifications and Alternatives

In the above embodiments, techniques have been described for detecting the presence of a rogue hotspot by analysing the data packets generated by a client device when they connect to a genuine hotspot. If it is determined that the previous hotspot was a rogue access point, the authentic hotspot alerts the user of the client device that their data may have been compromised due to the rogue hotspot.

In a modification of any of the above embodiments, after a rogue hotspot is detected, the PAC gateway is modified so as to notify genuine hotspots which are near genuine hotspot which detected the rogue access point of the detected rogue. In this way, relevant wireless clients who are already connected to the hotspot network and in the vicinity of the genuine hotspot which detected the rogue hotspot are warned that there is a rogue hotspot in the area. This can be carried out as a multicast message, or by accessing the user profile to obtain a telephone number or email.

In the embodiments the genuine hotspots are configured to perform the MAC address checks. In an alternative, the genuine hotspots forward the checks to the PAC gateway which carries out the authentication checks.

What is claimed is:

1. A method of detecting unauthorised wireless access points within a wireless access network having a plurality of authorised access points, a network core and a plurality of client devices, the method being performed by each authorised access point and comprising:
   establishing a connection from one of the client devices to an authorised access point;
   receiving data packets from the one of the client devices connected to the authorised access point, wherein said one of the client devices was previously connected to another access point in the wireless access network and the received data packets are addressed to that another access point;

upon receipt, at the authorised access point, of the data packets addressed to the another access point and transmitted from the one of the client devices connected to the authorised access point, initiating performance of an unauthorised access point detection including:

analysing network address information contained in the data packet, the analysed network address information including the network information of the another wireless access network that said one of the client devices was previously connected to; and determining the presence of an unauthorised wireless access point by comparing said analysed network address information against predetermined criteria, the analysed network address information including the network information of the another wireless access network that said one of the client devices was previously connected to; and alerting said connected one of the client devices that an unauthorised wireless access point has been detected if the network address information in the received packet does not match predetermined criteria.

2. A method according to claim 1 wherein:

determining the presence of an unauthorised wireless access point if the network address in the received packet does not match predetermined criteria, includes matching at least a part of data link layer address information with a list of authorised addresses.

3. A method according to claim 1, wherein determining the presence of an unauthorised wireless access point if the network address in the received packet does not match predetermined criteria, includes checking for data link layer address spoofing.

4. A method according to claim 2 wherein the link layer address information is a MAC address.

5. A method according to claim 1, wherein the alerting includes sending a message to the one of the client devices notifying the user that the one of the client devices was previously connected to an unauthorised access point.

6. A method according to claim 1, further comprising determining contact information for the user of one of the client devices and wherein the alerting includes contacting the user of the one of the client devices via said determined contact information.

7. A method according to claim 3, wherein data link layer address spoofing is detected by consulting a server containing a list of MAC address and IP address pairings.

8. A method according to claim 3, wherein the location of each authorised access point is stored in a server and the method further comprises comparing the received network address with the stored location data.

9. A method according to claim 1, further comprising notifying other authorised access points that an unauthorised access point has been detected.

10. A wireless access point device within a wireless access network having a plurality of wireless access points and a plurality of client devices, the wireless access point device comprising:

a network interface for connecting to at least one of the client devices;

a data packet receiver for receiving data packets from a connected one of the client devices wherein said connected one of client devices was previously connected to another wireless access point in the wireless access network and the received data packets are addressed to that another wireless access point;

a packet analyser for analysing network address information contained in the data packets, the analysed network address information including network information of the another wireless access network that said one of the client devices was previously connected to, and the analysis by the packet analyser being initiated upon receipt by the data packet receiver of the data packets addressed to the another access point and transmitted from the one of the client devices connected to the wireless access point device, for performance of an unauthorised access point detection;

a detector for determining the presence of an unauthorised wireless access point within the wireless access network by comparing the analysed network address information against predetermined criteria, the analysed network address information including the network information of the another wireless access network that said one of the client devices was previously connected to; and an alert generator for alerting said connected one of the client devices that an unauthorised wireless access point has been detected if the network address information in the received packet does not match predetermined criteria.

11. A wireless access point device according to claim 10 wherein:

the predetermined criteria include matching at least a part of data link layer address information.

12. A wireless access point device according to claim 10 wherein the predetermined criteria include checking for address spoofing.

13. A wireless access point device according to claim 11 wherein the link layer address information is a MAC address.

14. A wireless access point device according to claim 10, wherein the alert generator is configured to send a message to the one of the client devices notifying the user that the one of the client devices was previously connected to an unauthorised access point.

15. A wireless access point device according to claim 10, further comprising a determiner for determining contact information for the user of the one of the client devices and wherein the alert generator is configured to contact the user of the one of the client devices via said determined contact information.

16. A wireless access point device according to claim 12, wherein the detector is configured to detect data link layer address spoofing by consulting a server containing a list of MAC address and IP address pairings.

17. A wireless access point device according to claim 12, wherein the location of each authorised access point is stored in a server and the detector is further configured to compare the received network address information with the stored location data.

18. A wireless access point device according to claim 10, wherein the alert generator is further configured to notify other authorised access points that an unauthorised access point has been detected.

19. A wireless access network comprising:

a plurality of client devices and a plurality of wireless access points, wherein at least one of the wireless access points comprises:

a network interface for connecting to at least one of the client devices;

a data packet receiver for receiving data packets from at least a connected one of the client devices wherein said connected one of the client devices was previously connected to another wireless access point in the wireless access network and the received data packets are addressed to that another wireless access point;

a packet analyser for analysing network address information contained in the data packets, the analysed network address information including network information of the another wireless access network that said one of the client devices was previously connected to, and the analysis by the packet analyser being initiated upon receipt by the data packet receiver of the data packets addressed to the another access point and transmitted from the one of the client devices connected to the wireless access point device, for performance of an unauthorised access point detection;

a detector for determining the presence of an unauthorised wireless access point within the wireless access network by comparing the analysed network address information against predetermined criteria, the analysed network address information including the network information of the another wireless access network that said one of the client devices was previously connected to; and an alert generator for alerting said at least one of connected one of the client devices that an unauthorised wireless access point has been detected if the network address information in the received packet does not match predetermined criteria.

* * * * *